June 13, 1939.　　　D. A. LYONS ET AL　　　2,161,968
APPARATUS FOR MANUFACTURING OR LINING PIPES
Filed May 7, 1938　　　3 Sheets-Sheet 1

INVENTORS
DANIEL A. LYONS
LLOYD R. EARL
BY Harold W. Mattingly
ATTORNEY

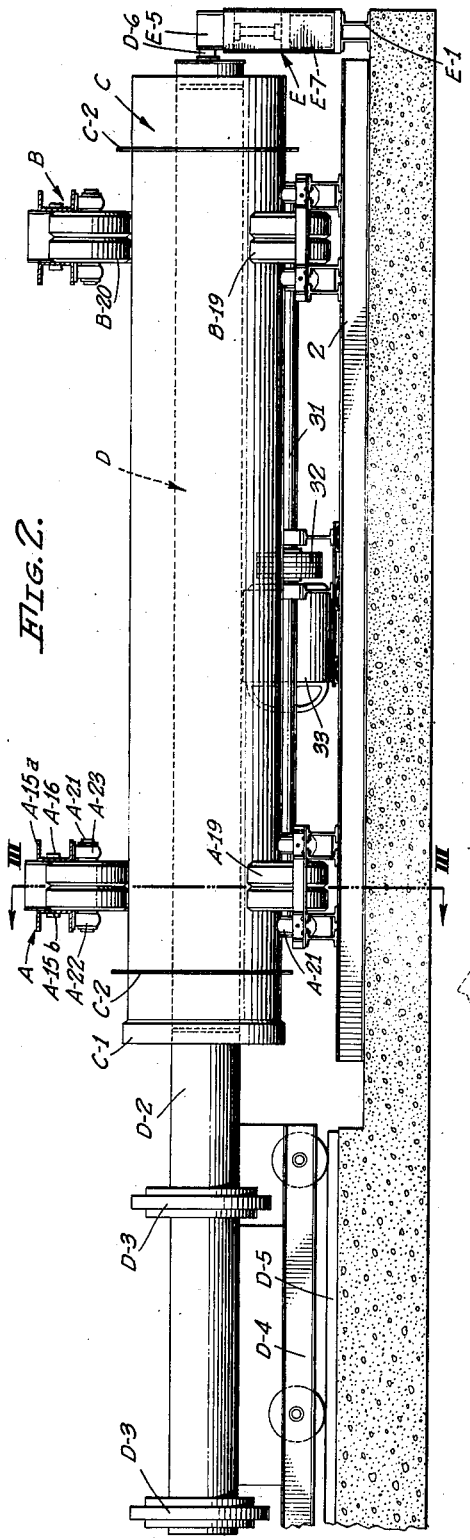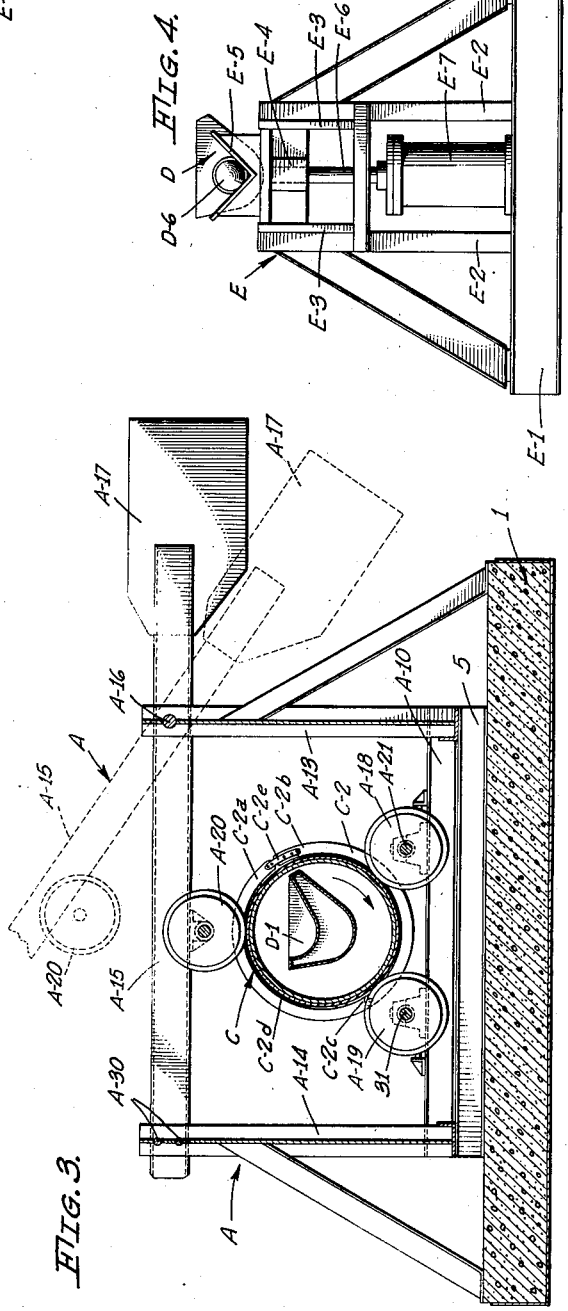

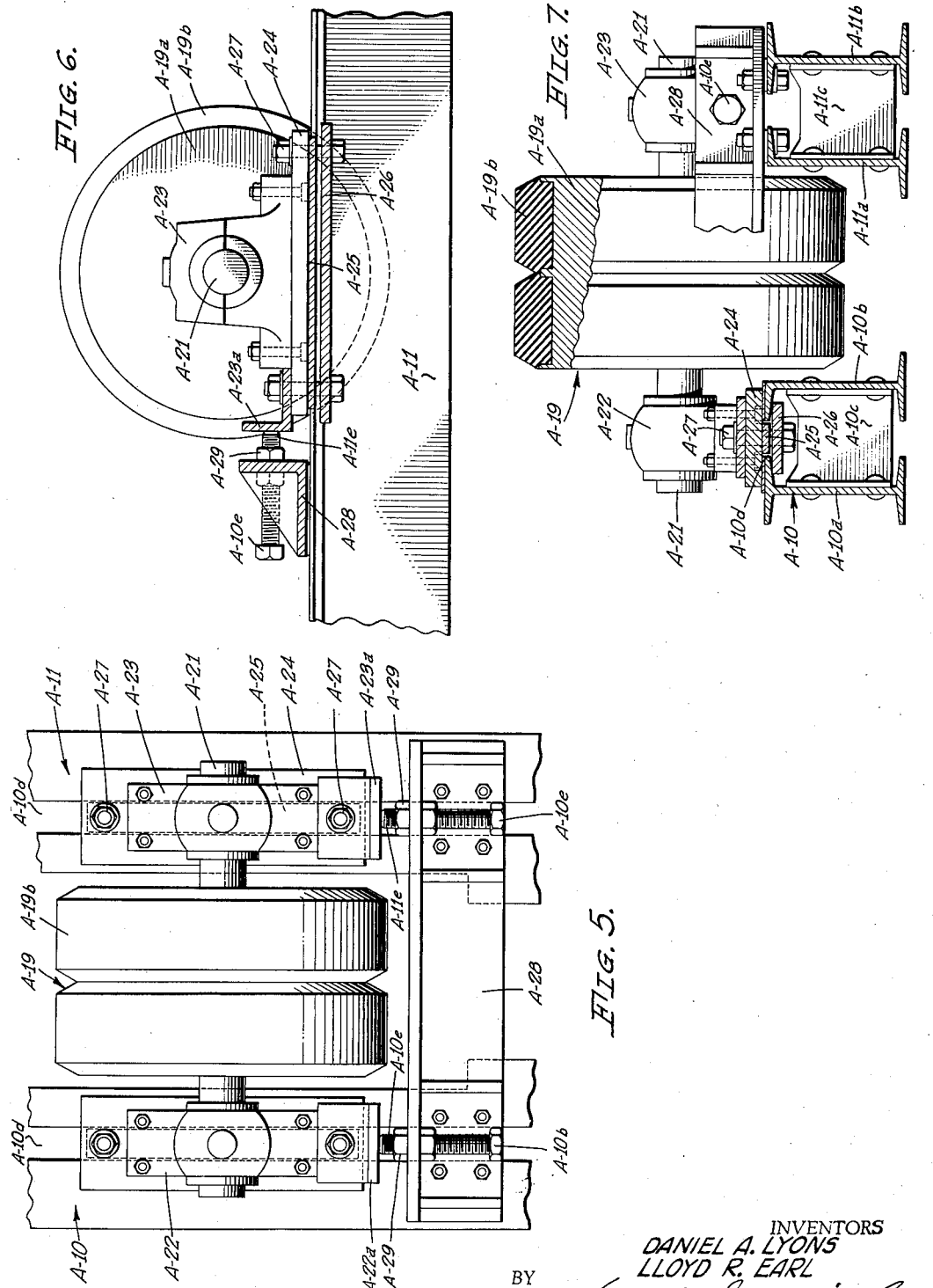

Patented June 13, 1939

2,161,968

UNITED STATES PATENT OFFICE 2,161,968

APPARATUS FOR MANUFACTURING OR LINING PIPES

Daniel A. Lyons, Los Angeles, and Lloyd R. Earl, Alhambra, Calif., assignors to Consolidated Steel Corp., Ltd., Los Angeles, Calif., a corporation of California Application May 7, 1938, Serial No. 206,688

11 Claims. (Cl. 91—42)

Our invention relates to the manufacture of pipes and has particular reference to the manufacture of pipes from concrete or similar plastic material and to the lining or coating of metal pipes with a layer of concrete or similar plastic material. For certain applications of pipes, it has been desirable to employ pipe sections constructed either solely of concrete or similar material, or to employ metal pipe sections having a lining of concrete or similar material distributed over the entire inner surfaces of the pipes.

It has long been known that the most satisfactory method of manufacturing concrete pipes or applying concrete or similar linings to metal pipes is by the centrifugal process whereby the concrete is rendered extremely dense and strong and in which the interior surfaces of such pipes are formed primarily of the lighter materials in the concrete and present a relatively smooth inner surface particularly adapted for the conveying of liquids.

Two different methods of producing either solid concrete pipes or concrete linings for metallic pipes by the centrifugal method have been employed, one in which the molds or the metal shells of the pipes are rotated about a rigidly fixed axis while the other, used primarily for the lining of metallic pipes or pipe shells, consists in mounting the pipes upon belts which both support and impart a rotary motion to the shells but without rigidly confining the axis of rotation. Both of these methods are unsatisfactory for producing long sections of pipe, namely, in excess of 12 to 20 feet, and pipes of large diameters, for example, in excess of 48 inches, by reason of the fact that it is extremely difficult, if not impossible, to so balance the molds or shells that they may be rotated at high speeds without producing such lateral motion or vibration or forces tending to move the rotational axis in a lateral direction that uniform wall thickness either of all concrete pipes or linings for metallic pipes cannot be obtained.

It is therefore an object of our invention to provide an apparatus for producing either all concrete pipes or concrete linings for pipes in which the molds or shells may be supported and rotated at relatively high speeds without permitting undue lateral motion of their rotational axes.

Another object of our invention is to provide apparatus for supporting and rotating either molds for all concrete pipe or shells for lined metallic pipes in which the axes of rotation of the molds or shells may be resiliently restrained to a substantially fixed point.

Other objects and advantages of our invention will be apparent from a study of the following specifications, read in connection with the accompanying drawings, wherein Fig. 1 is a top plan view of a pipe spinning machine constructed in accordance with our invention;

Fig. 2 is a side elevational view of a pipe spinning machine constructed in accordance with our invention and illustrating particularly the manner in which a trough employed to introduce the lining material into the pipe may be maintained in accurate horizontal alignment during the deposit of the material;

Fig. 3 is a sectional view taken along line III—III of Fig. 2;

Fig. 4 is a detail view of a jack which may be employed in the practice of our invention to line the trough in a truly horizontal position during the dumping of the lining material within the pipes;

Fig. 5 is a detail plan view of one of the supporting and guiding roller assemblies upon which the pipes may rest during the spinning operation;

Fig. 6 is an end elevational view of the roller assembly shown in Fig. 5; and

Fig. 7 is a detail side elevational view, partly in section, of the roller assembly illustrated in Figs. 5 and 6.

Figure 1:
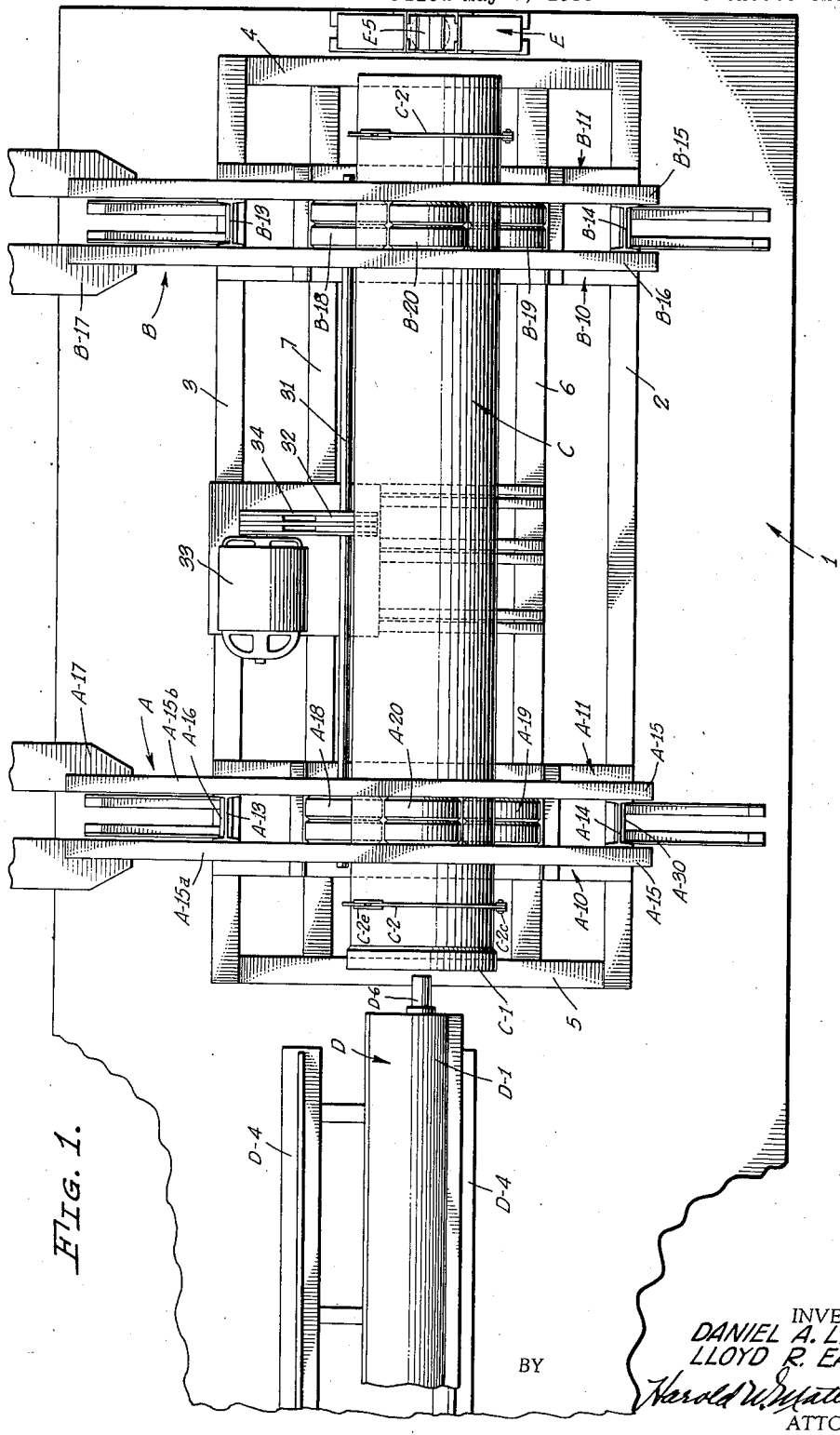

Considering, first, the application of our invention to the lining of previously formed pipe sections or shells, it should be noted that for the economical construction of pipe lines using pipes having coatings or linings of concrete or similar plastic material, several important considerations should be noted, among which are:

(1) The pipe sections or units from which the lines are to be constructed should be made as long as is possible to handle and install to thus reduce labor involved in placing and connecting up of the sections;

(2) Each of the sections should have as little weight as is possible to achieve, without sacrifice of adequate strength, in order to facilitate the handling of the sections during transportation and installation, and to keep the cost of the materials employed in each section at a minimum; and (3) The thickness of the linings and the thickness of the shells of such pipe sections must be maintained as low as possible without undue sacrifice of strength in order that the total amount of expansion or contraction of the shell material and the lining material may not be such as to cause cracking of the lining material or to cause separation of the lining material from the shell material.

With these considerations in mind, it follows that for concrete lined pipes, the shells should comprise relatively long cylinders having relatively thin walls while the lining may comprise a thin coating of concrete uniformly distributed throughout the interior of the pipe, so bonded to the shell by the spinning of the shell during the introduction and setting of the concrete as to insure great adherence between the lining and the shells. We have discovered that satisfactory pipe sections having lengths up to 30 or more feet and having internal diameters up to 56 or more inches may be successfully made by first forming a shell of the desired length and of the desired diameter from plate steel having a thickness of approximately ⅜ of an inch, such shells being preferably constructed by rolling and welding the plate material into a cylinder of more or less uniform cylindrical shape. Such shells may then be provided with a lining of concrete having a uniform thickness of approximately ½ inch, such thickness of shell and such thickness of lining producing a sufficiently strong pipe to withstand the normal handling necessary to transport the pipe to the point of installation and installing of the same without damage to the linings.

It is obvious that the quantity of materials required for such pipe sections will be so low as to permit of the construction of pipe lines at relatively low cost.

The essential features of the method by which such inexpensive pipe sections may be constructed include:

(1) The spinning of the shells at a relatively high speed without permitting undue lateral motion of the shells during the spinning operations;

(2) The introduction of the coating material into the pipe in such manner that the material is initially deposited in the pipe with a substantially uniform thickness of deposit throughout the length of the pipe;

(3) The introduction of the lining materials at such time as the shell is spinning at a low linear speed, say between 600 and 1000 f. p. m., and continuing the rotation of the shells at such low speed to permit the lining material to level off substantially under the influence of gravity and without appreciable effect of centrifugal action; and (4) Gradually and substantially uniformly accelerating the speed of rotation of the pipes up to a speed ranging between 3500 and 5000 f. p. m., and then maintaining the rotation of the shells at this high speed for from 10 to 15 minutes to permit the lining material to become set and to adhere to the shells.

The apparatus which is required to carry out the foregoing method must include mechanism for supporting such long lengths of shells as may be desired with the application of the points of support thereto so distributed along the lengths of the shells as to prevent appreciable sagging of any portions of the shells and to so constrain the shells against lateral movement during the spinning operations as to prevent any appreciable accumulation of lateral motion of the shell even though the shell may not be truly circuluar in cross section. Such apparatus must also include mechanism by which the lining material may be inserted into the pipe while the pipe is spinning and to deposit the material therein with a substantially uniform distribution thereof throughout the entire length of the pipe.

One form of satisfactory apparatus of this character is illustrated herein as including a suitable base 1 which may be constructed as a concrete slab upon which the bed of the machine may rest, the bed of the machine being constructed as a substantially rectangular perimetric frame including longitudinal beams 2 and 3 and end beams 4 and 5 with a plurality of intermediate longitudinal braces 6 and 7 disposed between the rails 2 and 3.

Arranged upon the bed of the machine near opposite ends thereof are a pair of vertically extending frames or standards A and B, these standards and their assembled structure being identical and identical parts being given the same reference characters with the prefix "A" or "B" to distinguish between the two assemblies.

The standard A comprises base members A—10 and A—11 extending across and secured to the longitudinal beams 2, 3, 6 and 7 of the base of the machine and from which rise vertical posts A—13 and A—14. Extending across the tops of posts A—13 and A—14 is a movable top bar A—15 comprising a pair of spaced channels A—15a and A—15b, the bar being pivoted to post A—13 as at A—16 and counter-weighted as at A—17 (see Fig. 3), so as to permit the top bar to readily swing in a vertical plane from a position extending across the space between the posts A—13 and A—14 to a position disposed substantially in vertical alignment with the post A—13.

The standard A constitutes the mounting means for a plurality of rollers A—18, A—19 and A—20, the roller A—19 being illustrated particularly in Figs. 5, 6 and 7 as being mounted upon a relatively short but heavy shaft A—21 journaled near each of its ends in a bearing A—22 and A—23, respectively. The bearing A—22 is provided with and is mounted upon a bearing plate A—24 adapted to rest upon and slide along the upper flanges of a pair of eye beams A—10a and A—10b which constitute the base member A—10 of the standard A. The eye beams A—10a and A—10b are preferably held in spaced parallel relation by means of a plurality of spacing brackets A—10c so as to provide an elongated slot A—10d into which a tongue A—25 projects, formed upon and projecting downwardly from the bearing plate A—24 to act as a guide permitting the bearing plate A—24 and its associated bearing A—22 to be slid toward or away from the longitudinal center of the machine, a clamping plate A—26 being provided below the flanges of the eye beams A—10a to engage and clamp the bearing plates A—24 in any desired adjusted location as by means of tightening bolts A—27.

The bearing A—23 is similarly mounted upon spaced eye beams A—11a and A—11b to permit the bearing A—23 to be slid along the base member A—11 comprised thereby so that the roller 19 may be disposed with its shaft A—21 extending in parallel alignment with the longitudinal axis of the machine, but may be adjusted toward and away from the longitudinal center line of the machine and may be held in any adjusted position by means of jack screws A—10e and A—11e mounted in an angle bar A—28 extending between the base members A—10 and A—11. The bearings A—22 and A—23 may each be provided with angle brackets A—22a and A—23a against which the outer ends of the jack screws A—10e and A—11e abut, whereby by rotation of the jack screws the bearings A—22 and A—23 may be moved toward and be held in any adjusted position relative to the longitudinal axis of the machine, suitable lock nuts A—29 being employed to hold the jack screws in any adjusted position.

The roller A—18 is similarly mounted upon the base members A—10 and A—11 so that it may be adjusted toward and away from the longitudinal center line of the machine.

The rollers A—18, A—19 and A—20 act to support the shell C of the pipe during the spinning operations, each of these rollers being constructed, as illustrated particularly in Figs. 5, 6 and 7, of a suitable metal body A—19a to the outer periphery of which is secured a facing of rubber or similar material A—19b, the facing material being preferably constructed in the manner of solid rubber tires having considerable thickness so as to be sufficiently rigid to support the load of the pipes and their concrete lining during the spinning operations but having sufficient resiliency to tend to absorb any lateral motion or shocks which may occur between the shell C and the rollers during the rapid rotation of the shell C.

By referring particularly to Figs. 1 and 2, it will be noted that the spacing of the standards A and B along the base of the machine may be selected such that a pipe shell C when in place in the machine will be engaged by the roller sets A—18, A—19 and B—18, B—19 at points spaced inwardly from the ends of the pipes approximately ⅕ of the length of the pipe, it having been found that in handling pipe lengths of 20 feet or more the pipe may be supported at two points along its length without appreciable sagging of the pipe by so locating the points of support therefor.

As heretofore explained, the shell C is preferably formed of relatively thin plate steel, for example, for a pipe 30 feet long and approximately 55 to 60 inches in diameter, the plate of ⅜ of an inch thickness may be used, rolled and welded into a substantially cylindrical shape and having one of its ends C—1 rolled or otherwise enlarged to form a bell end thereon. When employing a shell of such thin material it may be found that the shell will not hold its true circular cross section and we therefore prefer to provide one or more shaping rings C—2 removably mounted upon the shell C at predetermined spaced points therealong. As illustrated herein, two of such clamping or shaping rings C—2 are used, each of the rings comprising a pair of complementary semi-circular strips of metal C—2a and C—2b hinged together as indicated at C—2c, each of the strips being provided with a plurality of short shell-engaging feet C—2d to engage the shell C at a plurality of spaced points distributed substantially evenly about the circumference of the shell. The rings C—2 may be placed upon the pipe shell C by opening the strips C—2a and C—2b about their pivots C—2c and then the strips are clamped together by any suitable clamping and holding means C—2e illustrated as comprising one or more short strips of metal extending in overlapping relation upon both of the strips C—2a and C—2b, the strips C—2a and C—2b being drawn together to exert a compressive strain upon the shell C throughout its circumference. The effect of the rings C—2 will be to draw the shell material into a truly circular configuration.

By mounting the top rollers A—20 and B—20, respectively, upon the cross bars A—15 and B—15, these cross bars and rollers may be swung out of the way of the entrance of a pipe shell C into the machine. As indicated particularly in Fig. 3, the car bar A—15 may be swung about its pivot A—16, as indicated in dotted lines, to provide an unobstructed passage for the pipe shell C which may then be lifted by cranes or other suitable handling equipment and lowered directly downwardly into the machine to come to rest upon the roller sets A—18, A—19 and B—18, B—19. Then the cross bar A—15, may be swung back downwardly to its full line or horizontal position as shown in Fig. 3 and locked in place by any suitable locking or holding means such as one or more locking pins A—30 which may be inserted through the cross bar A—15, and through the upright A—14. Similarly the cross bar B—15 may be swung open in the same manner and when returned to the horizontal position may be held in lace by corresponding locking pins associated with the standard B.

At this point it should be noted that the rollers A—18 and A—19 are adjustably spaced from each other on opposite sides of the longitudinal center of the machine so as to engage the shell C on opposite sides of the vertical plane extending along the longitudinal plane extending along the longitudinal axis of the pipe C and by adjusting the rollers A—18 and A—19 toward and away from each other, provision may be made for receiving pipe shells of different diameters, the primary consideration being that the rollers A—18 and A—19, together with the roller A—20, should define a 3-point contact disposed about the circumference of the pipe shell C which will prevent the pipe from passing outwardly between any pair of adjacent rollers.

The spacing of the rollers B—18 and B—19 associated with the standard B should be the same as the spacing for the rollers A—18 and A—19 so that when the pipe shell C rests upon the rollers the longitudinal axis of the pipe will be disposed in a true horizontal position.

One of the sets of rollers upon each standard may be employed not only to support the pipe but to apply driving force thereto. In the form of the device illustrated herein, a longitudinally extended shaft 31 is employed to mount the rollers A—18 and B—18, such shaft being rigidly connected to these rollers and being provided at some point therealong with a suitable sprocket 32 to which power may be supplied from a motor 33 as by means of a driving chain 34. The motor 33 is preferably an electric motor, the speed of which may be accurately controlled so that the rollers A—18 and B—18 may be rotated at a plurality of progressively increasing speeds to impart rotary motion to the pipe shell C at any desired rate.

With the apparatus thus far described, it will be apparent that a pipe shell C having been placed in the machine and the uppermost rollers A—20 and B—20 having been brought into their full line positions as shown in Fig. 3, the motor may be started to rotate the pipe shell C, preferably at a relatively low speed, say 600 f. p. m.

The rotation of the pipe shell C at this speed will permit the operator of the machine to note whether or not the pipe shell C is sufficiently circular to admit of its being rotated at the higher speeds which will be required to produce the centrifugal action necessary for the successful lining of the pipe with concrete or similar coating material. While the pipe and shell C is being rotated at this relatively low speed, the lining material may be introduced into the shell C.

The introduction of the lining material may be accomplished in any suitable manner depending upon the particular character of the material to be employed. When it is desired to employ concrete as the lining material, the concrete should be mixed to a relatively thin consistency and may be introduced into the pipe shell C by means of a trough D preferably constructed as illustrated and described in our copending application Serial No. 214,226, filed June 17, 1938, and which may consist of a shallow pan D—1 having a length approximately equal to the greatest length of pipe shell C to be lined in the machine, the pan D—1 being mounted upon an arm D—2 rotatably mounted in suitable bearings D—3 upon a travelling carriage D—4 mounted upon a suitable track D—5, disposed in longitudinal alignment with the longitudinal axis of the spinning machine. The pan D—1 may therefore be charged with a suitable quantity of the concrete or other lining material which has been calculated to be sufficient to produce the desired thickness of lining; then the pan D—1 and the carriage D—4 may then be moved toward the spinning machine to introduce the pan and its contents into the interior of the pipe shell C.

In lining relatively long lengths of pipe sections, the pan D—1 must be so long that it is substantially impossible to support the same from one of its ends without the opposite end of the pan sagging or deflecting from a truly horizontal position. In order therefore to insure that the pan D—1 will be held in a truly horizontal position during the deposit of the concrete or other lining material in the shell C, we provide a centering pack E located upon the spinning machine at the end thereof opposite to that upon which the track 5 and carriage 4 are located.

While the jack E may be constructed as an integral part of the spinning machine, we have illustrated the same as being a separate unit adapted to be mounted upon the base 1 and preferably consisting of a bottom rail E—1 from which rises a pair of vertical legs E—2 upon the upper ends of which are formed a pair of slide-ways E—3 constituting guides within which a slide E—4 may move in a vertical direction, the slide E—4 being provided at its upper end with a V-shaped shoe E—5 adapted to engage a pin D—6 secured to and extending outwardly from the pan D—1. The shoe and slide E—4 are preferably secured to the piston or movable member E—6 of a suitable jacking mechanism illustrated as an hydraulic jack E—7 mounted upon the bottom rail E—1.

With the jacking mechanism E constructed as herein described, the shoe E—5 may be normally disposed at a considerably lower level than the lowermost point assumed by the pin D—6 when the trough D is extended through the shell C and then by operating the jack E—7 the shoe E—5 will engage the pin D—6 and elevate that end of the trough D until the entire pan D—1 assumes a horizontal position and the substantially liquid lining material contained therein will be evenly distributed throughout the pan. Now by rotating the arm D—2 in a clockwise direction, as shown in Fig. 3, the material contained within the pan D—1 will be dumped therefrom and distributed in a substantially even manner throughout the entire length of the pipe shell C.

In accordance with our method, the lining material should be introduced into the pipe while the pipe is being rotated at a relatively low peripherate speed as, for example, between 600 and 1000 f. p. m. and this speed should be maintained for a few minutes so that the lining material may have an opportunity to spread out, level off, and become evenly distributed throughout the entire area of the pipe, while still substantially unaffected by centrifugal force. This leveling out of the material is of extreme importance as it avoids uneven or wavy effects in the lining material.

Immediately thereafter the speed of rotation of the shell C should be gradually accelerated from this low peripheral speed to a peripheral speed of approximately 3500 to 5000 f. p. m., the gradual increase in speed giving the material an opportunity to shake down evenly and to permit the water to gradually draw toward the surface of the lining material. The rotation of the shell C at this higher speed should be continued over a period of from 10 to 15 minutes, the centrifugal action causing the heavier particles to be thrown outwardly toward the interior surface of the shell C, insuring an adequate bond between the lining material and the shell C while the lighter particles and the excess water will be drawn inwardly toward the surface of the lining. When concrete is used for the lining material, the rotation at the higher speed should be continued a sufficiently long period of time to permit the concrete to become thoroughly set and it will be found that at the end of from 10 to 15 minutes of rotation at the high speed the major portion of the water will have been extracted from the lining material so that at this time the spinning of the pipe C may be stopped and the lining will be found to be sufficiently hard and compact as to hold its shape within the pipe without fear of separation from the shell C.

We have found that by employing this relatively high speed of rotation of the pipe C permits the employment of a relatively thin coating of material, particularly concrete, successful pipes having been constructed in commercial quantities having a lining of only ½ inch in thickness. The lining material is found to be of uniform thickness throughout the entire interior of the pipe, indicating that the shell C has been uniformly rotated about its longitudinal axis without any appreciable lateral motion or vibration of the pipe during the spinning process.

As will be understood by those skilled in the art, it is substantially impossible to produce a shell C which is truly uniformly circular throughout its length and in which the material of the shell will be so uniformly distributed as to accurately place the center of gravity of the shell at its longitudinal axis. By employing our machine for supporting and rotating the shell, the shell need not be extremely accurately formed nor accurately balanced as to the distribution of weight throughout the circumference of the shell since our machine employing the resilient rollers and a positive 3-point contact distributed about the circumference of the shell permits a small lateral motion or vibration in the pipe without permitting such motion to become cumulative. The pipe being at all times in engagement with the surfaces of the rollers, any movement of the shell in a lateral direction will cause it merely to press tighter against one of the rollers and such movement will be immediately arrested. By reason of the resilience of the rollers, these forces will be cushioned and absorbed so that the effect is substantially that of rotating the shell C about a rigid axis.

While it will be understood that it is possible to rotate the pipe shell C at a relatively high peripheral speed when merely resting upon the lower rollers A—18, A—19 and B—18, B—19, the employment of the upper rollers A—20 and B—20 provides not only for the arresting of any lateral motion in the pipe in order to hold the axis of rotation substantially stationary but also acts as a safeguard when a shell section C is encountered, so abnormally out of "round" or unbalanced as would be likely to cause the shell to be thrown entirely away from the lower rollers of the machine. The upper rollers A—20 and B—20 therefore act as safeguards which will prevent possible injury to the machine or to the operator of the machine from a defective pipe section, any lateral motion of the pipe being sufficiently restrained to permit the machine to be stopped before any danger occurs. If desired, two or more upper rollers may be used on each frame or standard in place of the single rollers A—20 or B—20 shown.

While in the preceding detailed description we have shown how concrete linings may be placed in relatively thin pipe shells C, it will be apparent that other types of lining materials such as bituminous plastics or other well known lining materials may be introduced into the pipe sections in a substantially liquid form and be distributed and compacted as uniformly thick coatings or linings upon the interior of the shells.

It will be understood by those skilled in the art that the same apparatus as hereinbefore described may be employed for the molding of all-concrete pipes by the centrifugal process by merely substituting a substantially cylindrical mold in place of the shell C, such mold being constructed of any suitable length and any suitable diameter to produce the desired length and diameter of finished concrete pipe. Such molds could be introduced into the machine by lowering the same between the vertical posts of the frame or standards A and B when the cross bars of each of these standards had been moved to their retracted positions. The molds may be rested upon the rollers A—18, A—19 and B—18, B—19 in the same manner as described for supporting the pipe shell C.

A sufficient quantity of concrete material may be introduced into the molds by employing a trough D substantially as described herein and the molds may be rotated first at the low speed to permit the material to level out and then at the higher speeds to produce the centrifugal action necessary to compact the material within the mold.

It will be observed therefore that we have provided a method and apparatus for producing relatively inexpensive lined pipe in which a thin shell of metal may be lined with a uniformly distributed thin coating of lining material, the thinners of the lining material being possible primarily by reason of the ability to hold the shell against any appreciable lateral motion during the spinning thereof and thus permitting the spinning of the shells at a higher speed than has heretofore been possible. By employing out method and apparatus, a strong pipe section may be produced with a minimum of both metal and lining material.

While we have shown and described the preferred embodiment of our invention, we do not desire to be limited to any of the details of construction shown or described herein, except as defined in the appended claims.

We claim:

1. In a machine for spinning pipes or pipe molds about their longitudinal axes, a plurality of sets of rollers spaced longitudinally along the pipe or mold, each set including laterally spaced supporting rollers to directly engage the surface of the pipe or mold below the axes thereof and at least one roller to directly engage the surface of the pipe or mold above the axis thereof to constrain the axis of rotation against substantial lateral displacement in any direction.

2. In a machine for spinning pipes or pipe molds about their longitudinal axes, a plurality of sets of rollers spaced longitudinally along the pipe or mold, each set including laterally spaced supporting rollers to engage the pipe or mold below the axes thereof and at least one roller to engage the pipe or mold above the axis thereof, and means associated with each of said rollers for resiliently constraining the said axis of rotation against substantial lateral displacement in any direction.

3. In a machine for spinning pipes or pipe molds about their longitudinal axes, a plurality of sets of rollers spaced longitudinally along the pipe or mold, each set including laterally spaced supporting rollers to engage the pipe or mold below the axes thereof and at least one roller to engage the pipe or mold above the axis thereof to constrain the axis of rotation against substantial lateral displacement in any direction, each of said rollers having resilient pipe or mold-contacting surfaces thereon to cushion lateral motion of the pipe or mold.

4. In a machine for spinning pipes or pipe molds about their longitudinal axes, a plurality of sets of rollers spaced longitudinally along the pipe or mold, each set including laterally spaced supporting rollers to engage the pipe or mold below the axes thereof and at least one roller to engage the pipe or mold above the axis thereof to constrain the axis of rotation against substantial lateral displacement in any direction, each of said rollers having a rubber tire thereon to constitute a pipe or mold-contacting surface.

5. In a machine for spinning pipes or pipe molds about their longitudinal axes, a plurality of sets of rollers spaced longitudinally along the pipe or mold, each set including laterally spaced supporting rollers to engage the pipe or mold below the axes thereof and at least one roller to engage the pipe or mold above the axis thereof to constrain the axis of rotation against substantial lateral displacement in any direction, and means for rotating one of the rollers of each set to impart rotary motion to said pipe or mold.

6. In a machine for spinning pipes or pipe molds about their longitudinal axes, a plurality of sets of rollers spaced longitudinally along the pipe or mold, each set including laterally spaced supporting rollers to engage the pipe or mold below the axes thereof and at least one roller to engage the pipe or mold above the axis thereof to constrain the axis of rotation against substantial lateral displacement in any direction, and means mounting the upper roller for movement out of the path of a pipe or mold being lowered upon the supporting rollers.

7. In a machine for spinning pipes or pipe molds about their longitudinal axes, a base; a pair of vertically disposed frames extending across said base and spaced from each other along the base by a distance less than the length of the pipe or mold, and a plurality of rollers on each frame for engaging the exterior of the mold and including a pair of supporting rollers spaced from each other on opposite sides of and below the axis of the pipe or mold and at least one roller disposed above said axis to restrain lateral motion of said pipe or mold when rotated.

8. In a machine for spinning pipes or pipe molds about their longitudinal axes, a base; a pair of vertically disposed frames extending across said base and spaced from each other along the base by a distance less than the length of the pipe or mold, a plurality of rollers on each frame for engaging the exterior of the mold and including a pair of supporting rollers spaced from each other on opposite sides of and below the axis of the pipe or mold and at least one roller disposed above said axis to restrain lateral motion of said pipe or mold when rotated, and means mounting the lower rollers of each frame for adjustment toward and away from each other.

9. In a machine for manufacturing or lining pipes by centrifugal action, a base; a pair of vertically disposed frames extending across said base and spaced from each other along the base by a distance less than the length of the pipe or mold, each of said frames including a bottom member extending across said base, a pair of rollers spaced along said bottom member to engage and support a pipe or mold, a top member extending above said supporting rollers, at least one restraining roller mounted upon said top member to engage the upper side of the pipe or mold to restrain lateral motion thereof while rotating; and means mounting said top member for movement out of the path of a pipe or mold being lowered upon or raised from said supporting rollers.

10. In a machine for manufacturing or lining pipes by centrifugal action, means for supporting a pipe or mold with its longitudinal axis disposed in the horizontal and for rotating the same about said axis, means for introducing lining material or pipe material into the pipe or mold including a trough having a length sufficient to extend throughout the length of the pipe or mold and supported at one of its ends for movement into and out of the pipe or mold, and means for engaging and supporting the other end of said trough to hold the same horizontally disposed within the pipe or mold during discharge of the material.

11. In a machine for manufacturing or lining pipes by centrifugal action, means for supporting a pipe or mold with its longitudinal axis disposed in the horizontal and for rotating the same about said axis, means for introducing lining material or pipe material into the pipe or mold including a trough having a length sufficient to extend throughout the length of the pipe or mold, a carriage disposed at one end of said pipe or mold for engaging one end of said trough and for inserting said trough into and through said pipe or mold, and means disposed at the opposite end of said pipe for engaging the free end of said trough to raise the trough to and sustain it in horizontal position throughout its length.

DANIEL A. LYONS.
LLOYD R. EARL.